(12) United States Patent
Johnson

(10) Patent No.: US 12,703,627 B2
(45) Date of Patent: Aug. 11, 2026

(54) HYDROGEN ENHANCED GEOTHERMAL POWER PRODUCTION

(71) Applicant: Koloma, Inc., Columbus, OH (US)

(72) Inventor: Peter L. Johnson, Dublin, OH (US)

(73) Assignee: Koloma, Inc., Columbus, OH (US)

( * ) Notice: Subject to any disclaimer, the term of this patent is extended or adjusted under 35 U.S.C. 154(b) by 441 days.

(21) Appl. No.: 18/206,962

(22) Filed: Jun. 7, 2023

(65) Prior Publication Data

US 2023/0391616 A1 Dec. 7, 2023

Related U.S. Application Data

(60) Provisional application No. 63/349,905, filed on Jun. 7, 2022.

(51) Int. Cl.

*C01B 3/00* (2026.01)
*C01B 3/04* (2006.01)
*C01B 3/24* (2006.01)

(52) U.S. Cl.

CPC .................. *C01B 3/04* (2013.01); *C01B 3/24* (2013.01); *C01B 2203/0233* (2013.01); *C01B 2203/0475* (2013.01); *C01B 2203/0866* (2013.01); *C01B 2203/1241* (2013.01); *C01B 2203/84* (2013.01); *C01B 2203/86* (2013.01)

(58) Field of Classification Search

None

See application file for complete search history.

(56) References Cited

U.S. PATENT DOCUMENTS

| | | | |
|---|---|---|---|
| 4,382,912 A | 5/1983 | Madgavkar et al. | |
| 7,426,959 B2 | 9/2008 | Wang et al. | |
| 8,136,592 B2 | 3/2012 | Hsu et al. | |
| 2003/0010652 A1* | 1/2003 | Hunt | F24T 10/20 205/742 |
| 2004/0146288 A1 | 7/2004 | Vinegar et al. | |
| 2006/0185985 A1 | 8/2006 | Jones | |
| 2009/0056941 A1 | 3/2009 | Valdez | |

(Continued)

FOREIGN PATENT DOCUMENTS

| | | | |
|---|---|---|---|
| CN | 214221410 U | 9/2021 | |
| CN | 114506817 A | 5/2022 | |
| WO | WO-2020234464 A1 * | 11/2020 | B01D 53/62 |

OTHER PUBLICATIONS

Non-Final Office Action for U.S. Appl. No. 18/133,889 mailed Apr. 25, 2024.

(Continued)

*Primary Examiner* — Stefanie J Cohen
(74) *Attorney, Agent, or Firm* — K&L Gates LLP

(57) ABSTRACT

An energy system includes a natural or enhanced geothermal reservoir having a subsurface rock formation and an energy source integrated into the natural or enhanced geothermal reservoir configured to convert heat to energy. The energy source can include at least one of: a hydrogen source included in the subsurface rock formation, a methane or other hydrocarbon gas source, and a dihydrogen sulfide source. The dihydrogen sulfide and the methane or other hydrocarbon gas source can be converted to hydrogen and an associated carbon dioxide or sulfur reaction product can also be sequestered by mineralization in the subsurface rock formation following the conversion.

12 Claims, 3 Drawing Sheets

(56) References Cited

U.S. PATENT DOCUMENTS

| | | | |
|---|---|---|---|
| 2011/0220351 A1 | 9/2011 | Surguchev et al. | |
| 2011/0277474 A1* | 11/2011 | Constantz | B01D 53/73 423/220 |
| 2013/0113480 A1 | 5/2013 | Kadayam et al. | |
| 2014/0114576 A1 | 4/2014 | Jain et al. | |
| 2015/0361833 A1 | 12/2015 | Hinders et al. | |
| 2020/0096663 A1 | 3/2020 | Shetty et al. | |
| 2021/0104764 A1* | 4/2021 | Allo | H01M 8/0656 |
| 2021/0301658 A1 | 9/2021 | Zhang et al. | |
| 2022/0083048 A1 | 3/2022 | Cella et al. | |
| 2023/0050823 A1 | 2/2023 | Darrah et al. | |

OTHER PUBLICATIONS

Doveton, "Basics of Oil & Gas Log Analysis" [online], 1999 (1999) [retrieved on Jul. 24, 2023]. Retrieved from the internet: <URL:https://www.kgs.ku.edu/PRS/Info/pdf/doveton.PDF>.

International Search Report and Written Opinion mailed Aug. 11, 2023 for PCT Application No. PCT/US2023/016610.

International Search Report and Written Opinion mailed Aug. 30, 2023 for International Application No. PCT/US2023/018331.

International Search Report and Written Opinion mailed Aug. 31, 2023 for International Application No. PCT/US2023/024719.

Kelemen , et al., "Engineered carbon mineralization in ultramafic rocks for CO2 removal from Air: Review and New Insights", (2020). Chemical Geology, 550, 119628. https://doi.org/10.1016/j.chemgeo.2020.119628.

Mcqueen , et al., "Ambient weathering of magnesium oxide for CO2 removal from Air", (2020). Nature Communications, 11(1). https://doi.org/10.1038/s41467-020-16510-3.

Wang , et al., "Enhanced Hydrogen Production with Carbon Storage by Olivine Alteration in CO2-Rich Hydrothermal Environments." Journal of CO2 Utilitzation, vol. 30, 20219, pp. 205-213, https://doi.org/10.1016/j.jcou.2019.02.008.

Worman , et al., "Abiotic hydrogen (H2) sources and sinks near the Mid-Ocean Ridge (MOR) with implications for the subseafloor biosphere", (2020). Proceedings of the National Academy of Sciences, 117(24), 13283-13293. https://doi.org/10.1073/pnas.2002619117 Downloaded from https://www.pnas.org on Apr. 12, 2022.

Worman, Stacey Lynn, "Global Rates of Free Hydrogen (H2) Production by Serpentinization and other Abiogenic Processes within Young Ocean Crust", Department of Earth and Ocean Sciences Duke University, 2015.

* cited by examiner

HYDROGEN ENHANCED GEOTHERMAL POWER PRODUCTION

CROSS-REFERENCE TO RELATED APPLICATIONS

This application claims priority to U.S. Provisional Application No. 63/349,905 filed on Jun. 7, 2022, the disclosure of which is incorporated herein in its entirety by this reference.

BACKGROUND

Embodiments of the present disclosure relate generally to the field of energy extraction, geology, or geophysics. Some embodiments disclose methods and systems for utilizing hydrogen in power production. Current methods of hydrogen synthesis are extremely carbon and energy intensive. Nonetheless, once formed, hydrogen provides a clean energy source that eliminates the greenhouse gases that are produced from using hydrocarbons, e.g., gas and oil, as an energy source. As a result, various mechanisms for producing low- or negative-carbon or "green" hydrogen are being considered in various industrial sectors.

Hydrogen is a power source that has the potential to help reduce the usage of fossil fuels when combined with other sources. Hydrogen fuels are becoming more popular because they can be generated using sustainable energy sources such as geothermal, solar, wind, and hydroelectric power. Geothermal power plants offer many benefits over other methods used to generate hydrogen because it seems to be an environmentally friendly, reliable, and renewable energy source.

SUMMARY

Embodiments of the present disclosure relate generally to the field of energy extraction. Some examples are directed to a geothermal plant that has integrated the use of hydrogen combustion for increasing efficiency or output of the geothermal power plant. In some embodiments, hydrogen can be produced from or extracted from subsurface resources to enhance output from geothermal power plants. An energy system can include a first energy source including a natural or enhanced geothermal reservoir or other subsurface formation from which natural hydrogen can be produced.

In some examples, an energy system can include a natural or enhanced geothermal reservoir including a subsurface rock formation and an energy source integrated into the natural or enhanced geothermal reservoir configured to convert heat to energy. The energy source can include at least one of: a hydrogen source included in the subsurface rock formation, a methane or other hydrocarbon gas source, and a dihydrogen sulfide source. In some examples, the dihydrogen sulfide and the methane or other hydrocarbon gas source can be converted to hydrogen and an associated carbon dioxide or sulfur reaction product can be sequestered by mineralization in the subsurface rock formation following the conversion.

In some examples, the subsurface rock formation can include at least one of an iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral-bearing rock or sediment, partially or completely serpentinized rock, serpentinite, pyrite, iron-rich sandstone, other iron-rich sedimentary rock, or iron-rich sediments.

In some examples, the hydrogen source includes at least one of a subsurface stimulation of mafic rock, a natural hydrogen captured from the non-condensable phase vented from geothermal systems, or a hydrogen exsolved from geothermal water. The hydrogen can be integrated into the geothermal energy system by steam methane reformation, steam methane reformation with carbon capture utilization and storage, or electrolyzers. In some examples, the steam methane reformation, steam methane reformation with carbon capture utilization and storage, or electrolyzers can be integrated and/or included in the geothermal energy system by being connected directly to the geothermal system. In other examples, the hydrogen produced from the steam methane reformation, steam methane reformation with carbon capture utilization and storage, or electrolyzers can be added to the natural hydrogen captured from the geothermal system and either combusted, converted, or stored for further use. In some examples, the electrolyzers can include at least one of wind electrolysis, solar electrolysis, hydropower electrolysis, nuclear small modular reactor, collection of natural subsurface hydrogen, or pyrolysis.

In some examples, the mineralization in the subsurface rock formation can include reacting the carbon dioxide and dihydrogen sulfide with elements of the subsurface rock formation to form at least one of hydrogen gas, mineralized carbon, or mineralized sulfur. Reacting the carbon dioxide and dihydrogen sulfide with elements of the subsurface rock formation can include one or more of a serpentinization reaction, a pyritization reaction, or a decarbonation reaction. In some examples, the energy system can further include collecting the hydrogen gas formed by reacting the carbon dioxide and dihydrogen sulfide with elements of the subsurface rock formation.

In some examples, the energy system can include a fluid heat exchange system configured to heat a fluid injected into the natural or enhanced geothermal reservoir and provide heat for steam production in a steam turbine to produce electrical power. The energy source can be configured to augment heat from a natural or enhanced geothermal reservoir to produce electrical power.

In some examples, a method for extracting energy from a geothermal energy system from a subsurface rock formation can include generating hydrogen by at least one of wind electrolysis, solar electrolysis, hydropower electrolysis, nuclear small modular reactor, or collection of natural subsurface hydrogen and integrating the generated hydrogen into the geothermal energy system by steam methane reformation, steam methane reformation with carbon capture utilization and storage, or electrolyzers. In some examples, integrating the generated hydrogen into the geothermal energy system can include a hydrogen integration system. In the hydrogen integration system the generated hydrogen can be utilized to enhance or repower a geothermal powerplant. In some examples, enhancing or repowering a geothermal powerplant can include firing in an auxiliary boiler to produce steam in a flash plant or firing in a superheater to superheat steam upstream of a turbine in the flash plant. In other examples, enhancing or repowering a geothermal powerplant comprises firing in an economizer to increase the temperature of water in a flash plant or the temperature of brine in a binary cycle plant. Enhancing or repowering a geothermal powerplant can also include firing in a gas turbine or firing in an organic Rankine cycle facility to superheat the organic fluid.

In some examples, a method for energy production can include collecting hydrogen from a first hydrogen source, integrating the hydrogen into at least a portion of a geothermal energy system by combusting the hydrogen to produce energy, where the geothermal energy system includes a subsurface rock formation, and collecting additional hydrogen from the subsurface rock formation by injecting one or more of dihydrogen sulfide or carbon dioxide into the subsurface rock formation to react with components in the subsurface formation to form the additional hydrogen. The method can also include integrating the additional hydrogen into at least a portion of a geothermal energy system.

In some examples, the first hydrogen source comprises at least one of wind electrolysis, solar electrolysis, hydropower electrolysis, nuclear small modular reactor, or collection of natural subsurface hydrogen. The first hydrogen collected and the additional hydrogen can be integrated into the geothermal energy system by steam methane reformation, steam methane reformation with carbon capture utilization and storage, or electrolyzers. In some examples, the method can further include injecting water or brine recovered from the geothermal energy system to stimulate further hydrogen production. In some examples, the method can further include capturing and mineralizing $CO_2$ vented from the geothermal energy system.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the disclosure, wherein identical reference numerals refer to identical or similar elements or features in different views or embodiments shown in the drawings.

DETAILED DESCRIPTION

Figure 1:
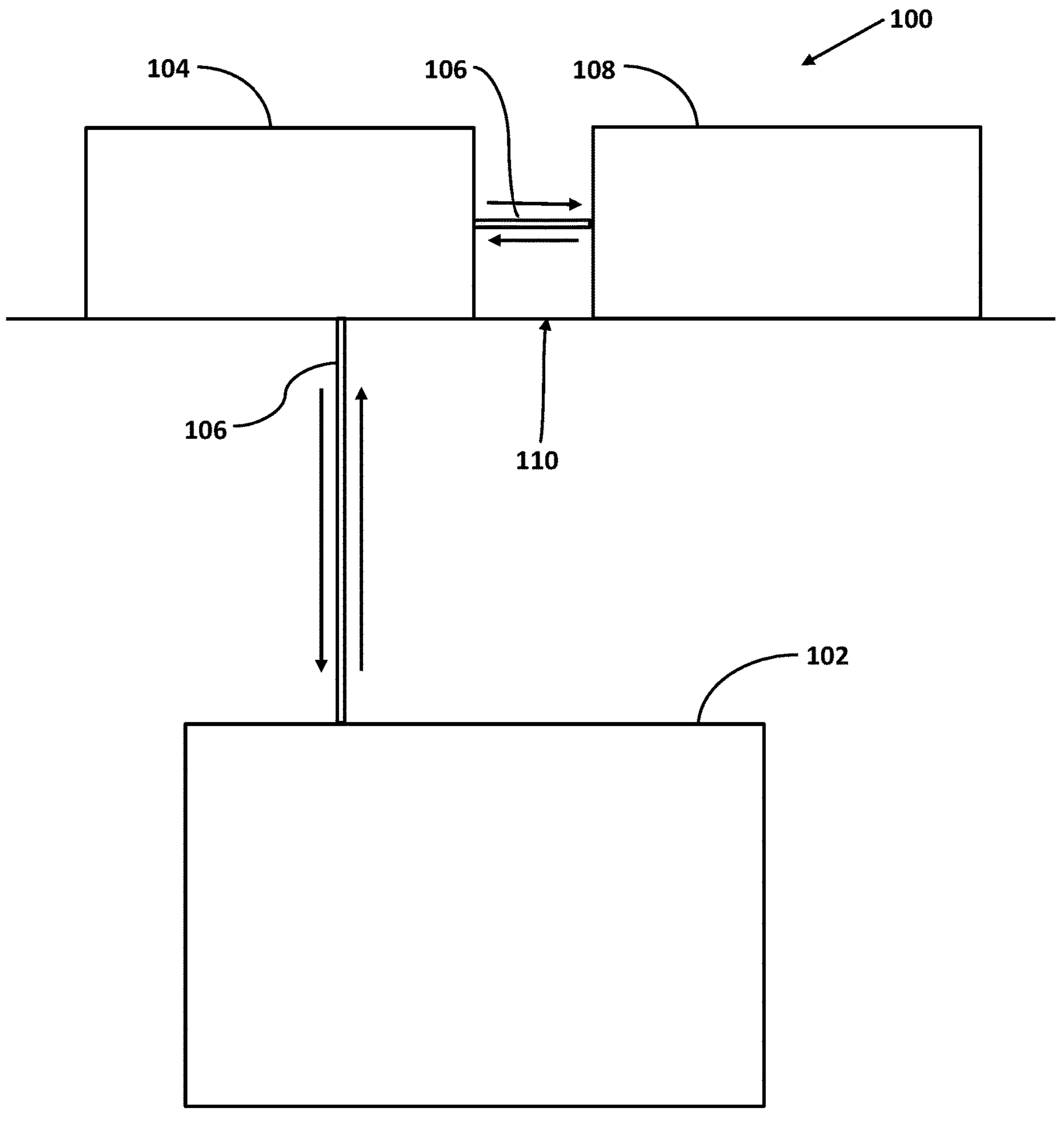
FIG. 1 is a block diagram of a system for producing energy from a geothermal system, according to an embodiment.

Embodiments of the present disclosure relates to methods and systems for utilizing hydrogen recovered from geothermal or other subsurface formations to supplement geothermal heat in geothermal power plants. In some examples, hydrogen produced from or extracted from subsurface resources can enhance output from geothermal power plants. The hydrogen can be generated from at least one of wind electrolysis, solar electrolysis, hydropower electrolysis, nuclear small modular reactor, or steam methane reformation paired with various forms of carbon sequestration.

Natural hydrogen and subsurface hydrogen production resources have overlap with many geothermal resources, while various other forms of hydrogen can be produced in diverse geographic settings by various means. A subset of geothermal plants (e.g., various fields in Iceland or on the west coast of the United States) reside in regions that tend to be associated with the presence of mafic rock, iron-rich rock, or iron-rich sediments which are noted targets for natural hydrogen extraction or enhanced hydrogen production. Thus, the coincidence of subsurface hydrogen resources or other synthetic hydrogen and geothermal power can enhance geothermal power plant performance by integrating hydrogen produced from these sources to produce heat for power production; an important aspect of this disclosure is the utilization of low carbon fuel on geothermal power plants with existing power purchase agreements in place. In other words, in some examples, hydrogen can be integrated into the geothermal power plant via fuel cells or combustion. Hydrogen is a clean fuel that, when consumed in a fuel cell, produces only water, electricity, and heat.

In a fuel cell, hydrogen and oxygen are combined. Generally, a fuel cell is composed of an anode, cathode, and an electrolyte membrane. A fuel cell passes hydrogen through the anode of the fuel cell and oxygen through the cathode. At the anode site, a catalyst splits the hydrogen molecules into electrons and protons. The protons pass through the porous electrolyte membrane, while the electrons are forced through an electrical circuit, generating an electric current and excess heat. At the cathode, the protons, electrons, and oxygen combine to produce water molecules. As there are no moving parts, fuel cells can operate with high reliability.

Flash steam geothermal plants typically decline in performance over time due to either reduced subsurface temperatures, reduced hydrostatic pressure support in the subsurface, and/or mineral precipitation/scaling in subsurface reservoirs, particularly when a portion of steam is vented to the atmosphere instead of being condensed and reinjected into the geothermal reservoir. Binary cycle geothermal plant production also often declines due to changes in porosity and permeability in the geothermal reservoir, mineral precipitation/scaling in subsurface reservoirs, or reduced subsurface temperatures over time. As a result, a large portion of geothermal plants produce significantly below their installed turbine output capacity due to this production decline, and there is considerable stranded capital when the plants are not able to run at their nameplate capacity due to decreased or lack of thermal output. Regulations prevent most geothermal power plants from supplementing output by burning carbon-based fuels, or if they did, they would void high valued and existing power purchase agreements. Some geothermal plants have started to utilize solar power to offset other operational power uses, such as driving pumps, to counter the reduced thermal output of the facility, but this is not always allowed by power buyers and only slows the overall process of net power decline.

Natural hydrogen, hydrogen produced by subsurface stimulation of iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral-bearing rock or sediment, partially or completely serpentinized rock, serpentinite, pyrite, iron-rich sandstone, other iron-rich sedimentary rock, or iron-rich sediments, natural hydrogen captured from the non-condensable phase vented from geothermal systems, hydrogen exsolved from geothermal water, and other vent gases, in addition to hydrogen synthesized by various processes (e.g., steam methane reformation, steam methane reformation with carbon capture utilization, and storage, electrolyzers powered by various processes (e.g., solar, wind, hydroelectric, nuclear small modular reactor, pyrolysis)) could be utilized to supplement or repower a geothermal powerplant.

In some embodiments, an energy system can include a first energy source comprising a natural or enhanced geothermal reservoir. The energy system can include an energy source that is produced by other natural means or generated by other means discussed above. The geothermal reservoir can store natural or enhanced geothermal heat to be used to produce energy (e.g., electricity), such as via steam production for a steam turbine power plant. The energy system can include a geothermal energy system configured to convert natural or enhanced geothermal heat to energy. In some embodiments, the geothermal energy system can include a flash plant. The flash plant can include boilers that produce steam, superheaters, and/or turbines. In some embodiments, the geothermal energy system can include an organic Rankine cycle facility.

In some embodiments, a second energy source that utilizes hydrogen can be integrated into the geothermal energy system. For example, the hydrogen can be fired in an auxiliary boiler to produce additional steam for a flash plant. The hydrogen can be fired in a superheater to superheat steam upstream of a turbine in the flash plant. In some embodiments, hydrogen can be fired in an economizer to increase the temperature of water in a flash plant or the temperature of water or brine in a binary cycle plant. In some embodiments, the hydrogen can be fired in a gas turbine to produce power for operating parasitic equipment and waste-heat for increasing steam flow or temperature into the turbine. The hydrogen can also be fired to superheat an organic fluid in an organic Rankine cycle facility.

The organic Rankine cycle's principle is based on a turbogenerator working as a conventional steam turbine to transform thermal energy into mechanical energy and finally into electric energy through an electrical generator. Instead of generating steam from water, the organic Rankine cycle system vaporizes an organic fluid, characterized by a molecular mass higher than that of water, which leads to a slower rotation of the turbine, lower pressures and no erosion of the metal parts and blades. Unlike water, organic fluids usually suffer chemical deteriorations and decomposition at high temperatures. The maximum hot source temperature is thus limited by the chemical stability of the working fluid. The freezing point should be lower than the lowest temperature in the cycle. In some examples, the working fluid can include hydrofluorocarbons, or other fluorocarbons. The organic Rankine cycle turbogenerator uses a medium-to-high-temperature thermal oil to preheat and vaporize a suitable organic working fluid in the evaporator. The organic fluid vapor rotates the turbine, which is directly coupled to the electric generator.

In some examples, individual fuel cells can be joined with one another to form stacks. In turn, these stacks can be combined into larger systems to use the hydrogen. Because fuel cells generate electricity through chemistry rather than combustion, they can achieve higher efficiencies than other energy production methods, such as steam turbines and internal combustion engines. Efficiencies can be improved by integrating a fuel cell with a combined heat and power system that uses the fuel cell waste heat for heating applications.

In some embodiments, water or brine recovered from the geothermal power plants or other nearby power plants can be reinjected to stimulate additional hydrogen production. Reinjection wells can also be used to inject captured carbon dioxide into the subsurface instead of venting the $CO_2$ from the flash steam geothermal plants and catalyzing carbon mineralization processes in mafic rocks or other subsurface formations. Capturing the $CO_2$ can further decrease the carbon footprint of geothermal power production and lead to additional carbon offsets that benefit from this process.

In some embodiments, a process for extracting energy from a hydrogen source can include a hydrogen generation facility. The hydrogen generation facility can generate hydrogen from a variety of sources. In some embodiments, the sources can include at least one of wind electrolysis, solar electrolysis, hydropower electrolysis, nuclear small modular reactor, collection of natural subsurface hydrogen, or enhanced hydrogen production generation by various methods.

A method of energy production can include, in some embodiments, collecting hydrogen and integrating the hydrogen into at least a portion of a geothermal energy system. The hydrogen can be combusted to produce energy. For example, the hydrogen can be incorporated into boilers that produce steam, superheaters, and/or turbines. In some embodiments, the hydrogen can be incorporated into a geothermal energy system including an organic Rankine cycle.

The power systems disclosed herein may include a geothermal power generation system equipped to produce power from geothermal heat, a geothermal formation (subsurface or otherwise), a hydrogen collection system operably coupled to the geothermal formation for removing hydrogen gas therefrom (e.g., hydrogen separator), a supplemental energy device (e.g., heater, turbine, generator), conduits (e.g., well, pipes, conduits) between one or more components of the system, or electrical connections between one or more of the components of the system. The hydrogen from geothermal formations, such as in hydrogen gas or dihydrogen sulfide, may be separated from the emissions from the geothermal formation instead of merely venting the hydrogen. The hydrogen may be separated by an electrolyzer, reactor, membrane, or other system for separating hydrogen from other materials. The hydrogen may be utilized to produce power, either directly (e.g., via combustion in a generator or turbine) or indirectly (e.g., via combustion to produce heat to make steam). By utilizing hydrogen from the geothermal formation and/or at the geothermal power plant, a gas that is normally vented because it is non-compressible may be utilized to supplement power generation at the geothermal power plant.

FIG. 1 is a block diagram of a system 100 for producing energy from a geothermal system, according to an embodiment. Energy system 100 can include a natural or enhanced geothermal reservoir 102 and an energy source 104 integrated into the natural or enhanced geothermal reservoir 102. The natural or enhanced geothermal reservoir 102 can include porous, faulted, or geologically or incipiently fractured iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments with elevated ambient temperature conditions, i.e., geothermal systems with temperatures ranging from 25-500° C., depending on the mineralogy, pore size, or fracture intensity.

In some examples, the energy source 104 can include any of hydrogen, methane or any other hydrocarbon gases, carbon dioxide, dihydrogen sulfide, water, or the like. The natural or enhanced geothermal reservoir 102 can include natural or enhanced geothermal heat. Generally, the natural or enhanced geothermal reservoir 102 can be at least partially located below the surface 110 of the earth.

The energy source 104 integrated into the natural or enhanced geothermal reservoir can be configured to convert the natural or enhanced geothermal heat to energy. The energy source 104 may include a geothermal power plant, such as any geothermal power plant disclosed herein. For example, the energy source 104 may include a fluid heat exchange system configured to heat a fluid injected into the natural or enhanced geothermal reservoir and provide heat for producing steam in steam turbines to produce electrical power at the surface utilizing the heat from the fluid that has been heated in the natural or enhanced geothermal reservoir. The natural or enhanced geothermal reservoir 102 may be connected to the energy source 104 via one or more conduits 106. The one or more conduits 106 may include one or more pipelines, one or more wells, or the like. For example, the conduits 106 may include one or more of a recovery well and an injection well.

The energy source 104 is used to augment the heat from the natural or enhanced geothermal reservoir to produce electrical power. The energy source 104 may include one or more of a hydrogen source included in the subsurface rock formation, a methane or other hydrocarbon gas source, a carbon dioxide or dihydrogen sulfide source, or the like. The energy source 104 may be integrated into the energy system 100, such as via one or more conduits 106. The energy source 104 may be located on the surface 110 or below the surface 110, such as in the natural or enhanced geothermal reservoir or a separate natural (non-geothermal) subsurface reservoir. The energy source 104 may include hydrogen obtained by collection of natural subsurface hydrogen. In some examples, the energy source 104 can be produced at or include a gas production or separation facility at the surface. For example, the energy source 104 may include hydrogen from a hydrogen generation facility, wherein hydrogen is generated by at least one of wind electrolysis, solar electrolysis, hydropower electrolysis, or nuclear small modular reactor.

In some examples, the energy source 104 may include hydrogen, wherein the hydrogen source includes at least one of a subsurface stimulation of mafic rock, a natural hydrogen captured from the non-condensable phase vented from geothermal systems, or a hydrogen exsolved from geothermal water. In some examples, the hydrogen energy source 104 can integrated into the energy system 100, such as by combustion for supplying supplemental heat to the geothermal energy system. Hydrogen can also be integrated into the geothermal energy system by steam methane reformation, steam methane reformation with carbon capture utilization and storage, or electrolyzers 108. The electrolyzers 108 can include at least one of wind electrolysis, solar electrolysis, hydropower electrolysis, nuclear small modular reactor, collection of natural subsurface hydrogen, or pyrolysis.

Electrolysis can also offer flexibility to the network when it becomes congested during peak periods of generation by renewables. In some examples, electricity can be converted to hydrogen and then either transported to be used elsewhere in the system or stored until needed at a later date.

In some examples, the energy source 104 may include methane or other hydrocarbon gases, wherein the energy source 104 is integrated into the geothermal energy system. The methane or other hydrocarbon gases can be combusted to further supplement energy production. In some examples, the energy source 104 can be configured to augment heat from a natural or enhanced geothermal reservoir to produce electrical power. In some examples, the heat can be from the combustion process of the methane or other hydrocarbon gases. In some examples, the energy system comprises a fluid heat exchange system configured to heat a fluid injected into the natural or enhanced geothermal reservoir and provide heat for steam production in a steam turbine to produce electrical power.

In some examples, the energy source 104 includes a dihydrogen sulfide source. In some examples, dihydrogen sulfide ($H_2S$) can be injected into the geothermal energy system 100. In some examples, $H_2S$ can be dissolved in or combined with specifically treated or heated steam, water, hot water, brine, pressurized hot water, gray water, wastewater, seawater, geothermal fluids, geothermal exhaust fluids, or other heated thermal (e.g., waste heat) fluids.

The $H_2S$, co-produced with specifically treated or heated steam, natural hydrogen, or a mixture of other gases from geothermal systems can be injected directly or co-injected with specifically treated or heated steam, water, hot water, brine, pressurized hot water, gray water, wastewater, seawater, geothermal fluids, geothermal exhaust fluids, or other heated thermal fluids to increase the kinetics and yields of pyritization reactions that produce $H_2$ directly. The injected $H_2S$ increases the kinetics and yields of chemical alteration of the subsurface formation which increases surface area and rock volumes for ongoing reactions.

The dihydrogen sulfide and the methane or other hydrocarbon gas source are converted to hydrogen by pyritization and serpentinization/decarbonation reactions shown below in Tables 1-3. The pyritization and serpentinization/decarbonation reactions use the iron-rich mineral phases (e.g., olivine and pyroxene), as well as minor perovskite mineral phases, as a catalyst for sulfide reduction to pyrite mineral phases, carbon dioxide reduction to carbonate minerals, by and the production of hydrogen ($H_2$) gas. Further, a $CO_2$ reduction to carbonate minerals occurs. The reactions can occur in natural or induced fractures throughout the natural or enhanced geothermal reservoir 102.

TABLE 1

| Serpentinization Reactions | | | | |
|---|---|---|---|---|
| Mineral | Mineral Phase | Reaction | Moles of Igneous Mtrls | Moles of $H_2$ Generated |
| Olivine | Fayalite | $3Fe_2SiO_4 + 2H_2O \xrightarrow{yields} 2Fe_3O_4 + 3SiO_2 + 2H_2$ | 3 | 2 |
| Pyroxene | Ferrosilite | $3Fe_2Si_2O_6 + 2H_2O \xrightarrow{yields} 2Fe_3O_4 + 6SiO_2 + 2H_2$ | 3 | 2 |

In some examples, the pyritization can result in recovery of hydrogen and the potential to sequester, by mineralization, sulfur from natural (e.g., geothermal systems) or various anthropogenic sources or sulfur and carbon dioxide from natural (e.g., geothermal systems) or various anthropogenic sources. A temperature range for the pyritization and decarbonation/serpentinization reactions is between about 25° C. to about 500° C. It being understood that the temperature can be greater than about 100° C., greater than about 120° C., greater than about 150° C., less than about 500° C., less than about 400° C., from about 90° C. to about 500° C., from about 150° C. to about 250° C., and all temperatures with these values as well as higher and lower temperatures. Depending on the depth, geothermal gradient conditions of the iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments, and pore fluid chemistry in a specific geological setting, the temperature ranges described herein may be present in areas where there is excess geothermal heating of the ground which increases the kinetics of the pyritization and/or pyritization plus serpentinization/decarbonation reactions.

TABLE 2

| Decarbonation Reactions | | | | |
|---|---|---|---|---|
| Mineral | Mineral Phase | Reaction | Moles of Igneous Mtrls | Moles of $CO_2$ Sequestered |
| Olivine | Forsterite | $Mg_2SiO_4 + 2CO_2 \xrightarrow{yields} 2MgCO_3 + SiO_2$ | 1 | 2 |
| Pyroxene | Enstatite | $Mg_2Si_2O_6 + 2CO_2 \xrightarrow{yields} 2Mg_3CO_3 + 2SiO_2$ | 1 | 2 |
| Plagioclase | Anorthite | $CaAl_2Si_2O_8 + 2H_2O \xrightarrow{yields} CaCO_3 + Al_2Si_2O_5(OH)_4$ | 1 | 1 |
| Serpentine | Anorthite | $Mg_3Si_2O_5(OH)_4 + 3CO_2 \xrightarrow{yields} 3MgCO_3 + 2SiO_2 + 2H_2O$ | 1 | 3 |
| Brucite | Enstatite | $Mg(OH)_2 + CO_2 \xrightarrow{yields} MgCO_3 + 2H_2O$ | 1 | 1 |

Tables 1 and 2 show serpentinization and decarbonation reactions that generate hydrogen and mineralize $CO_2$. For example, with a geothermal gradient of 100° C./km (e.g., near geothermal systems), the reaction temperature of 100° C. can be obtained at a depth of one kilometer, while kinetics improves in the pyritization reaction until about 300° C., when Sabatier reactions can start to consume the generated hydrogen by reforming with $CO_2$ or dissolved inorganic carbon to produce abiogenic methane or other species if there is sufficient carbon dioxide fugacity in the pore fluid system. The temperatures of target formations capable of generating hydrogen by the reaction described herein can be maintained by the excess heat from the ambient geothermal gradient and the exothermic heat released by mineralization. The temperatures of the formation can be maintained for periods of between about 1 day and multiple decades. It being understood the temperature can be maintained for greater than about 30 days, greater than about 45 days, and greater than about 90 days, less than about 30 days, less than about 20 days, from about 1 day to more than 30 years.

TABLE 3

| Pyritization Reactions | | | |
|---|---|---|---|
| Reaction | Moles of Iron (II) Reacted | Moles of $H_2$ Generated | Moles of $H_2S$ Sequestered |
| $FeS + H_2S \xrightarrow{yields} FeS_2 + H_2$ | 1 | 1 | 1 |
| $Fe^{2+} + 2H_2S \xrightarrow{yields} FeS_2 + H_2 + 2H^+$ | 1 | 1 | 2 |
| $Cu^+ + Fe^{2+} + 2H_2S \xrightarrow{yields} CuFeS_2 + 0.5H_2 + 3H^+$ | 1 | 0.5 | 2 |

In some examples, $H_2$ produced from a reaction of the $H_2S$ and the natural or enhanced geothermal reservoir 102 can be collected and mineralized carbon and sulfur can be sequestered within the natural or enhanced geothermal reservoir 102.

Figure 2:
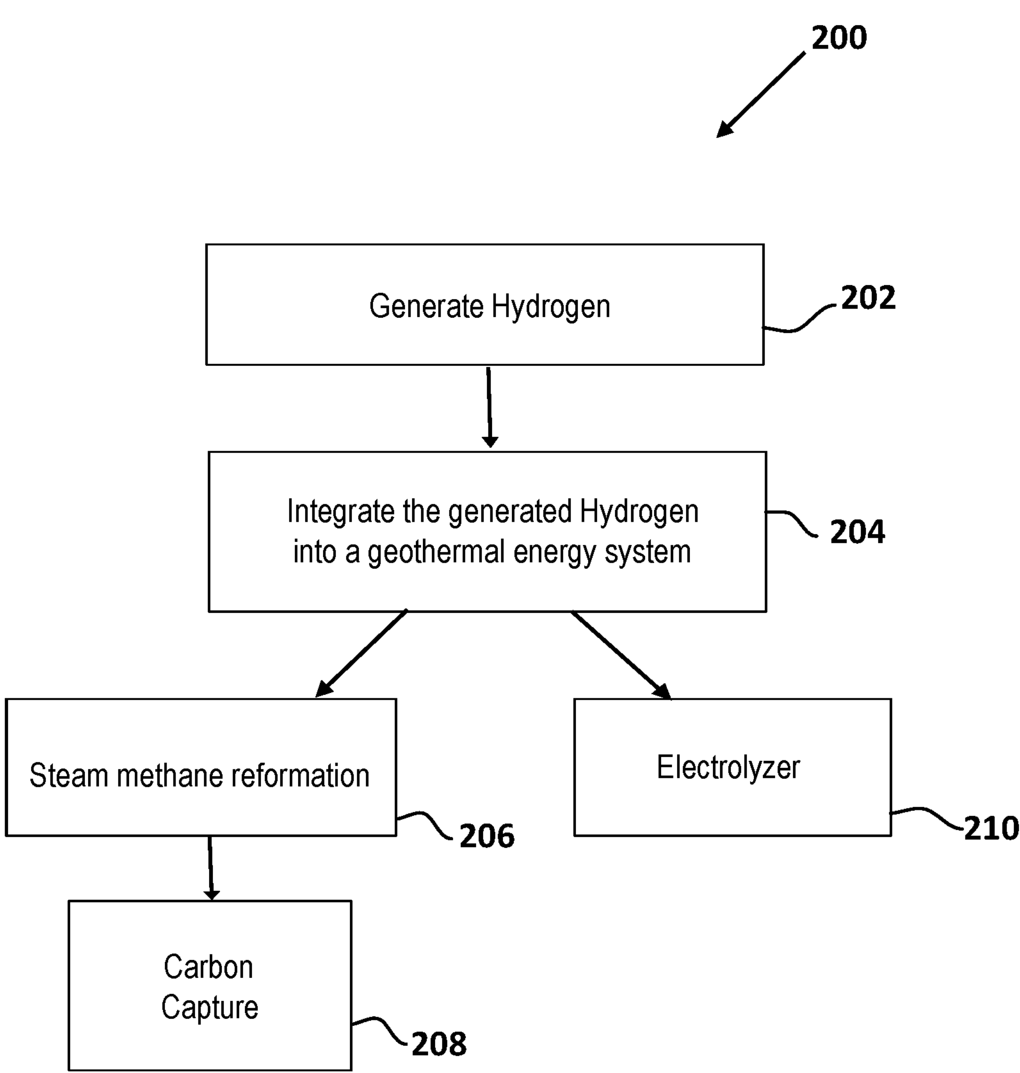
FIG. 2 is a flow chart of a method for extracting energy from a geothermal energy system, according to an embodiment.

The block diagram of FIG. 2 illustrates a flow diagram of a method 200 for extracting energy from a geothermal system. For example, energy may be produced by collecting hydrogen from a natural or enhanced geothermal reservoir, a natural hydrogen reservoir, or a hydrogen generation facility of various forms and integrating the hydrogen into at least a portion of the geothermal energy system 100 (FIG. 1). As shown in act 202, hydrogen can be generated for the energy system. In some examples, hydrogen can be generated by at least one of wind electrolysis, solar electrolysis, hydropower electrolysis, nuclear small modular reactor, or collection of natural subsurface hydrogen. In act 204, the generated hydrogen can then be integrated into the geothermal energy system by at least one of a steam methane reformation, a steam methane reformation with carbon capture utilization and storage, or an electrolyzer. In some examples the integration of the generated hydrogen can include a hydrogen integration system incorporated into either the wind electrolysis system, the solar electrolysis system, the hydropower electrolysis system, the nuclear small modular reactor, or the collection system of natural subsurface hydrogen. The hydrogen can be combusted to produce energy. For example, the hydrogen can be incorporated into boilers that produce steam, superheaters, and/or turbines. In some examples, the generated hydrogen can be utilized to enhance or repower a geothermal power plant.

In some examples, enhancing or repowering the geothermal power plant can include firing the hydrogen (or methane) extracted from the geothermal system (or produced from energy recovered from a geothermal system) in an auxiliary boiler to produce steam in a flash plant or firing in a superheater to superheat steam upstream of a turbine in the flash plant. In other examples, enhancing or repowering the geothermal power plant can include firing the hydrogen in an economizer to increase the temperature of water in a flash plant or the temperature of brine in a binary cycle plant. As used herein, an economizer is a mechanical device that reduces the amount of energy or reduces energy consumption, or preheating a fluid. In some examples, enhancing or repowering a geothermal power plant comprises firing in a gas turbine or firing in an organic Rankine cycle facility to superheat an organic fluid.

As shown in act 206, hydrogen can be produced by steam methane reformation. In steam-methane reforming, methane reacts with steam in the presence of a catalyst to produce hydrogen, carbon monoxide, and a relatively small amount of carbon dioxide. Subsequently, in what is called the "water-gas shift reaction," the carbon monoxide and steam are reacted using a catalyst to produce carbon dioxide and more hydrogen. In further processing, such as in "pressure-swing adsorption," carbon dioxide and other impurities are removed from the gas stream, leaving essentially pure hydrogen. In some examples, the catalyst can include nickel and silicon oxide.

In some examples, as shown in act 208, the steam methane reformation can include carbon capture. Several different technologies can be used to capture the carbon, which includes carbon dioxide and other carbon compounds. In some examples, the $CO_2$ can be separated from the exhaust of a combustion process. Once the $CO_2$ is captured, it can be compressed and stored in subsurface geological formations (e.g., natural or enhanced geothermal reservoir 102). In some examples, the carbon can be sequestered and mineralized as described above.

In some examples, as shown in act 210, the hydrogen can be integrated into the geothermal energy system by an electrolyzer. The electrolyzer can include any apparatus that produces hydrogen through electrolysis and is capable of separating the hydrogen and oxygen molecules of which water is composed using electricity. Water molecules are split into their constituent oxygen and hydrogen atoms. In some examples, an electrolyzer can include a conductive electrode stack separated by a membrane, to which a high voltage and current is applied. An electric current in the water causes the water to break down into its components: hydrogen and oxygen. The oxygen generated in parallel can be released into the atmosphere or can be stored for later use. The hydrogen can be integrated into the geothermal energy system.

Figure 3:
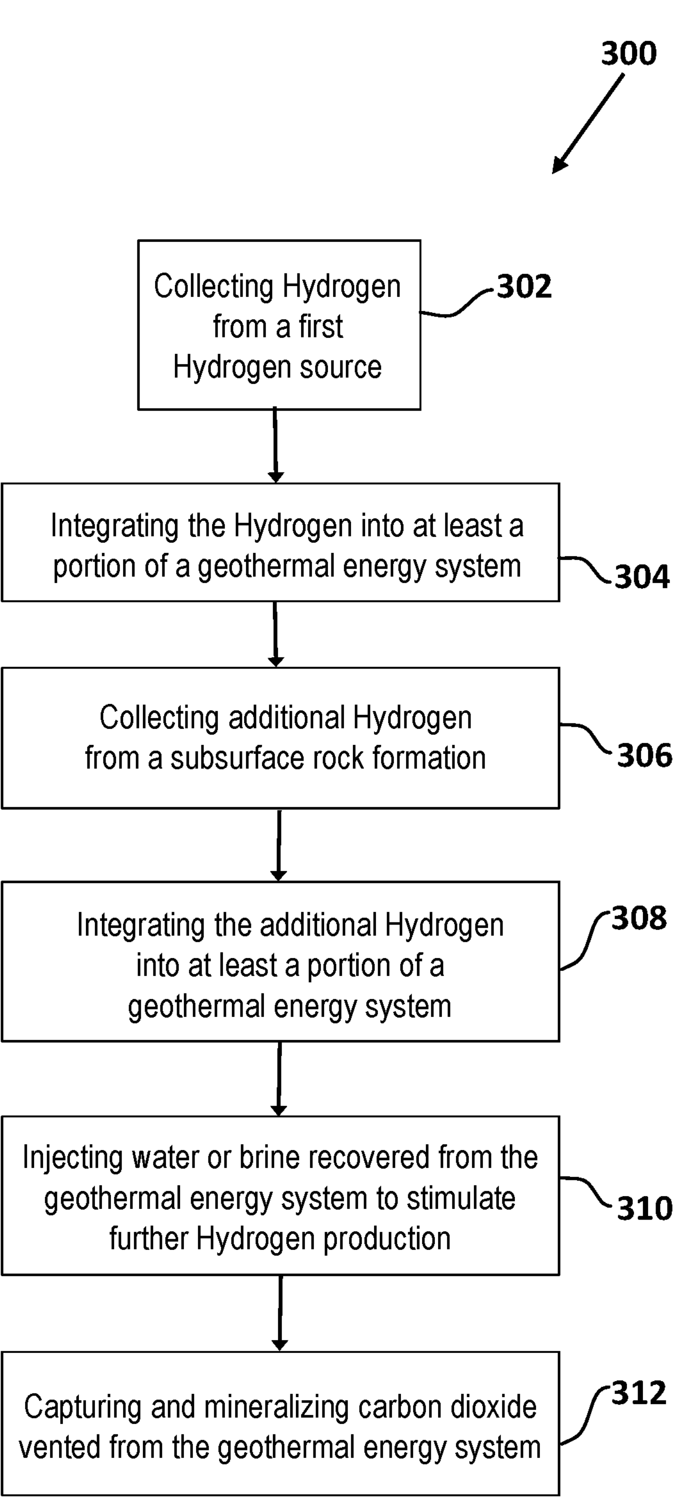
FIG. 3 is a flow chart of a method for energy production, according to an embodiment.

Referring to FIG. 3, a method 300 for energy production is shown. As shown in act 302, the method 300 can include collecting hydrogen from a first hydrogen source. In some examples, the first hydrogen source can include at least one of wind electrolysis, solar electrolysis, hydropower electrolysis, nuclear small modular reactor, or collection of natural subsurface hydrogen. In some examples, the hydrogen can be collected and stored for use later or can be directly fed into a geothermal energy system. In act 304, the hydrogen from the first hydrogen source can be integrated into at least a portion of the geothermal energy system by combusting the hydrogen to produce energy. The geothermal energy system can include a subsurface rock formation. The hydrogen can be integrated into the portion of a geothermal energy system by steam methane reformation, steam methane reformation with carbon capture utilization and storage, or electrolyzers as described above.

In act 306, the method 300 can further include collecting additional hydrogen from the subsurface rock formation by injecting one or more of dihydrogen sulfide or carbon dioxide into the subsurface rock formation to react with components in the subsurface formation to form the additional hydrogen. The injected dihydrogen sulfide and/or carbon dioxide can be dissolved in or combined with specifically treated or heated steam, water, hot water, brine, pressurized hot water, gray water, wastewater, seawater, geothermal fluids, geothermal exhaust fluids, or other heated thermal (e.g., waste heat) fluids. The dihydrogen sulfide and can be converted to hydrogen by pyritization and serpentinization/decarbonation reactions. $H_2$ produced from a reaction of the $H_2S$ and the subsurface rock formation can be collected and mineralized carbon and sulfur can be sequestered within the geothermal energy system.

In some examples, as shown in act 308, the additional hydrogen collected from the subsurface reactions can be collected and included to supplement into at least a portion of the geothermal energy system. The additional hydrogen can be integrated into the portion of a geothermal energy system by at least one of a steam methane reformation, a steam methane reformation with carbon capture utilization and storage, or an electrolyzer. In some examples, the method 300 can further include injecting water or brine recovered from the geothermal energy system to stimulate further hydrogen production, as shown in act 310. This water or brine can be any one of or a combination of thermal, heated, or otherwise temperature-controlled fluids (e.g., specifically treated or heated steam, water, hot water, brine, pressurized hot water, gray water, wastewater, seawater, geothermal fluids, geothermal exhaust fluids, or other heated thermal (e.g., waste heat fluids) in various forms. In some examples, the method 300 can also include act 312 of capturing and mineralizing $CO_2$ vented from the geothermal energy system. The capturing and mineralization of the $CO_2$ can be separated from the exhaust of a combustion process. Once the $CO_2$ is separated, it can be compressed and stored in subsurface geological formations (e.g., natural or enhanced geothermal reservoir 102). In some examples, the carbon can be sequestered and mineralized.

In the production of natural resources from formations within the earth, a well or borehole is drilled into the earth to the location where the natural resource is believed to be located. Similarly in the sequestration of greenhouse gases or other waste products in formations within the earth, a well or borehole is drilled into the earth to the location where the greenhouse gas or other waste product will be injected, stored, and sequestered. These natural resources may be hydrogen; helium; carbon dioxide; dihydrogen sulfide; methane or other hydrocarbon gases; a dihydrogen sulfide reservoir; a hydrogen reservoir; a helium reservoir; a carbon dioxide reservoir; a natural gas reservoir; a reservoir rich in dihydrogen sulfide; a reservoir rich in hydrocarbons; a reservoir rich in helium; the natural resource may be fresh water; brackish water; brine; it may be a heat source for geothermal energy; or it may be some other natural resource, ore deposit, mineral, metal, or gem that is located within the ground.

These resource-containing formations may be a few hundred feet, a few thousand feet, or tens of thousands of feet below the surface of the earth, including under the floor of a body of water, e.g., below the seafloor or beneath other natural resources, e.g., below aquifers. These formations may also cover areas of differing sizes, shapes, and volumes.

Typically, and by way of general illustration, in drilling a well an initial borehole is made into the earth, e.g., the surface of land or seabed, then subsequent smaller diameter boreholes are drilled to extend the overall depth of the borehole. In this manner as the overall borehole gets deeper its diameter becomes smaller; resulting in what can be envisioned as a telescoping assembly of holes with the largest diameter hole at the top of the borehole closest to the surface of the earth.

Thus, by way of example, the starting phases of a subsea drill process may be explained in general as follows. Once the drilling rig is positioned on the surface of the water over the area where drilling is to take place, an initial borehole is made by drilling a 36" hole in the earth to a depth of about 200-300 ft. below the seafloor. A 30" casing is inserted into this initial borehole. This 30" casing may also be called a conductor. The 30" conductor may or may not be cemented into place. During this drilling operation a riser is generally not used and the cuttings from the borehole, e.g., the earth and other material removed from the borehole by the drilling activity are returned to the seafloor. Next, a 26" diameter borehole is drilled within the 30" casing, extending the depth of the borehole to about 1,000-1,500 ft. This drilling operation may also be conducted without using a riser. A 20" casing is then inserted into the 30" conductor and 26" borehole. This 20" casing is cemented into place. The 20" casing has a wellhead secured to it. (In other operations an additional smaller diameter borehole may be drilled, and a smaller diameter casing inserted into that borehole with the wellhead being secured to that smaller diameter casing.) A BOP (blow out preventer) is then secured to a riser and lowered by the riser to the seafloor, where the BOP is secured to the wellhead. From this point forward all drilling activity in the borehole takes place through the riser and the BOP.

It should be noted that riserless subsea drilling operations are also contemplated.

For a land-based drill process, the steps are similar, although the large diameter tubulars, 30"-20" are typically not used. Thus, and generally, there is a surface casing that is typically about 13⅜" diameter. This may extend from the surface, e.g., wellhead and BOP, to depths of tens of feet to hundreds of feet. One of the purposes of the surface casing is to meet environmental concerns in protecting groundwater by preventing surface casing ventflow to groundwater aquifers or prevent surface casing ventflow of greenhouse gases or flammable gases to groundwater aquifers or the atmosphere. The surface casing should have sufficiently large diameter to allow the drill string, production equipment such as electronic submersible pumps (ESPs) and circulation mud to pass through. Below the casing one or more different diameter intermediate casings may be used. (It is understood that sections of a borehole may not be cased, which are referred to as open hole.) These can have diameters in the range of about 9" to about 7", although larger and smaller sizes may be used, and can extend to depths of thousands to tens of thousands of feet. The section of the well located within the reservoir, i.e., the section of the formation containing the natural resources, can be called the pay zone. Inside of the casing and extending from a pay zone, or production zone of the borehole up to and through the wellhead on the surface is the production tubing. There may be a single production tubing or multiple production tubings in a single borehole, with each of the production tubing endings at different depths.

Fluid communication between the formation and the well can be greatly increased by the use of hydraulic fracturing or other stimulation techniques. The first uses of hydraulic fracturing date back to the late 1940s and early 1950s. In general, hydraulic fracturing treatments involve forcing fluids down the well and into the formation, where the fluids enter the formation and crack, e.g., force the layers of rock to break apart or fracture. These fractures create channels or flow paths that may have cross sections of a few microns, to a few millimeters, to several millimeters in size, and potentially larger. The fractures may also extend out from the well in all directions for a few feet, several feet, and tens of feet or further. The fractures may be kept open by using a proppant (e.g., various sized sand or other mineral grains) that is forced down the well with the fracturing fluid in a single operation. It should be remembered that the longitudinal axis of the well in the reservoir may not be vertical: it may be on an angle (either sloping up or down) or it may be horizontal.

As used herein, unless specified otherwise, the terms "hydrogen exploration and production," "carbon dioxide exploration and production," "helium exploration and production," "dihydrogen sulfide exploration and production," "exploration and production activities," "E&P," "E&P activities," and similar such terms are to be given their broadest possible meaning, and include surveying, geological analysis, chemical assessment, well planning, reservoir planning, reservoir management, drilling a well, workover and completion activities, hydrogen production, flowing of hydrogen from a well, collection of hydrogen, secondary and tertiary recovery from a well, the management of flowing hydrogen from a well, carbon dioxide injection, carbon dioxide sequestration, carbon dioxide mineralization, dihydrogen sulfide injection, dihydrogen sulfide sequestration, dihydrogen sulfide mineralization, and any other upstream activities.

As used herein, unless specified otherwise, the terms "sulfur mineralization," "sulfur sequestration," "sulfur mitigation," "carbon dioxide mineralization," "carbon dioxide sequestration," "carbon dioxide mitigation," "carbon mineralization," "carbon sequestration," "carbon mitigation," and similar such terms are to be given their broadest possible meaning, and include surveying, geological analysis, well planning, reservoir planning, reservoir management, drilling a well, workover and completion activities, sulfur injection, dihydrogen sulfide injection, carbon injection, carbon dioxide injection, the management of flowing sulfur, dihydrogen sulfide, carbon, carbon dioxide to a well, and any other upstream activities.

As used herein, unless specified otherwise, the term "earth" should be given its broadest possible meaning, and includes the ground, all natural materials, such as rocks, and artificial materials, such as concrete, borehole casing, piping, or fill, that are or may be found in the ground.

As used herein, unless specified otherwise "offshore" and "offshore drilling activities" and similar such terms are used in their broadest sense and would include drilling activities on, or in, any body of water, whether fresh or salt water, whether manmade or naturally occurring, such as for example rivers, lakes, canals, inland seas, oceans, seas, such as the North Sea, bays and gulfs, such as the Gulf of Mexico. As used herein, unless specified otherwise the term "offshore drilling rig" is to be given its broadest possible meaning and would include fixed towers, tenders, platforms, barges, jack-ups, floating platforms, drill ships, dynamically positioned drill ships, semi-submersibles and dynamically positioned semi-submersibles. As used herein, unless specified otherwise the term "seafloor" is to be given its broadest possible meaning and would include any surface of the earth that lies under, or is at the bottom of, any body of water, whether fresh or salt water, whether manmade or naturally occurring.

As used herein, unless specified otherwise, the term "borehole" should be given its broadest possible meaning and includes any opening that is created in the earth that is substantially longer than it is wide, such as a well, a well bore, a well hole, a micro hole, a slimhole and other terms commonly used or known in the arts to define these types of narrow long passages. Wells would further include exploratory, discovery, production, abandoned, reentered, reworked, recirculation, and injection wells. They would include both cased and uncased wells, and sections of those wells. Uncased wells, or section of wells, also are called open holes, boreholes, open boreholes, open bores, or open hole sections. Boreholes may further have segments or sections that have different orientations, they may have straight sections and arcuate sections and combinations thereof. Thus, as used herein unless expressly provided otherwise, the "bottom" of a borehole, the "bottom surface" of the borehole and similar terms refer to the end of the borehole, i.e., that portion of the borehole furthest along the path of the borehole from the borehole's opening, the surface of the earth, or the borehole's beginning. The terms "side" and "wall" of a borehole should be given their broadest possible meaning and include the longitudinal surfaces of the borehole, whether or not casing or a liner is present; as such, these terms would include the sides of an open borehole or the sides of the casing that has been positioned within a borehole. Boreholes may be made up of a single passage, multiple passages, connected passages, (e.g., branched configuration, fishboned configuration, dual-lateral configuration, trilateral configuration, quadrilateral configuration, pitchfork configuration, pinnate configuration, or comb configuration), and combinations and variations thereof.

Boreholes are generally formed and advanced by using mechanical drilling equipment having a rotating drilling tool, e.g., a bit. For example, and in general, when creating a borehole in the earth, a drilling bit is extending to and into the earth and rotated to create a hole in the earth. To perform the drilling operation the bit must be forced against the material to be removed with a sufficient force to exceed the shear strength, compressive strength, or combinations thereof, of that material. The material that is cut from the earth is generally known as cuttings or drill cuttings, e.g., waste, which may be chips of rock, dust, rock fibers, and other types of materials and structures that may be created by the bit's interactions with the earth. These cuttings are typically removed from the borehole by the use of fluids, which fluids can be liquids, foams, or gases, or other materials known to the art.

As used herein, unless specified otherwise, the term "drill pipe" is to be given its broadest possible meaning and includes all forms of pipe used for drilling activities; and refers to a single section or piece of pipe. As used herein the terms "stand of drill pipe," "drill pipe stand," "stand of pipe," "stand" and similar type terms should be given their broadest possible meaning and include two, three, or four sections of drill pipe that have been connected, e.g., joined together, typically by joints having threaded connections. As used herein the terms "drill string," "string," "string of drill pipe," "string of pipe," and similar type terms should be given their broadest definition and would include a stand or stands joined together for the purpose of being employed in a borehole. Thus, a drill string could include many stands and many hundreds of sections of drill pipe.

As used herein, unless specified otherwise, the terms "formation," "reservoir," "pay zone," and similar terms, are to be given their broadest possible meanings and would include all locations, areas, and geological features within the earth that contain, may contain, or are believed to contain, hydrogen, carbon dioxide, helium, dihydrogen sulfide, or natural gas.

As used herein, unless specified otherwise, the terms "field," "oil field," "gas field" and similar terms, are to be given their broadest possible meanings, and would include any area of land, seafloor, or water that is loosely or directly associated with a geologic formation, and more particularly with a resource containing formation, thus, a field may have one or more exploratory and producing wells associated with it, a field may have one or more governmental body or private resource leases associated with it, and one or more field(s) may be directly associated with a resource containing formation.

As used herein, unless specified otherwise, the terms "conventional hydrogen," "conventional carbon dioxide," "conventional helium," "conventional dihydrogen sulfide," "conventional natural gas," "conventional," "conventional production" and similar such terms are to be given their broadest possible meaning and include hydrogen, carbon dioxide, helium, or dihydrogen sulfide that are trapped in structures in the earth. Generally, in these conventional formations, the hydrogen, carbon dioxide, helium, dihydrogen sulfide, or natural gas have migrated in permeable or semi-permeable formations to a trap or area where they are accumulated. Typically, in conventional formations, a non-porous, relatively impermeable layer is above, or encompassing the area of accumulated hydrogen, carbon dioxide, helium, dihydrogen sulfide, or natural gas, in essence trapping the hydrogen, carbon dioxide, helium, dihydrogen sulfide, or natural gas in the accumulation. Conventional reservoirs have been historically the sources of the vast majority of natural gas, hydrogen, carbon dioxide, helium, and dihydrogen sulfide observed. As used herein, unless specified otherwise, the terms "unconventional hydrogen," "unconventional carbon dioxide," "unconventional helium," "unconventional dihydrogen sulfide," "unconventional natural gas," "unconventional," "unconventional production," and similar such terms are to be given their broadest possible meaning and includes hydrogen, carbon dioxide, helium, dihydrogen sulfide, or natural gas that are held in impermeable rock, or which have not migrated to traps or areas of accumulation.

As used herein, unless specifically stated otherwise, the term "gold hydrogen" should be given its broadest possible meaning, and generally refers to hydrogen produced from the subsurface by drilling into and recovering hydrogen from subsurface systems or stimulating iron-rich rock, mafic rock, pyrite, iron-rich sandstone, iron-rich sediments, uranium- and thorium-rich rock, or uranium- and thorium-rich sediments with or without fracturing or other forms of mechanical stimulation that can provide an abundant source of low emission, low cost, fully dispatchable energy.

As used herein, unless specifically stated otherwise, the term "molecule" should be given its broadest possible meaning, and generally refers to a group of atoms bonded together, representing the smallest fundamental unit of a chemical compound that can take part in a chemical reaction.

As used herein, unless stated otherwise, room temperature is 25° C. And, standard temperature and pressure is 25° C. and 1 atmosphere.

Generally, the term "about" as used herein unless specified otherwise is meant to encompass a variance or range of +10%, the experimental or instrument error associated with obtaining the stated value, and preferably the larger of these.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

The term "$CO_2e$" is used to define carbon dioxide equivalence of other, more potent greenhouse gases, to carbon dioxide (i.e., methane and nitrous oxide) on a global warming potential basis of 100 years, based on IPCC AR5 methodology. The term "carbon intensity" is taken to mean the lifecycle $CO_2e$ generated per unit mass of a product.

$CO_2$ is widely recognized as a greenhouse gas (GHG), and the continued accumulation of $CO_2$ and other GHGs in the atmosphere is expected to cause problematic changes to global ecosystems and contribute to myriad other problems, such as ocean acidification and sea level rise. The two primary causes of carbon emissions globally are the use of fossil fuels for power generation and transportation.

Given the risks of $CO_2$ emissions, significant work has gone into finding replacements to existing high carbon energy sources, or ways to decarbonize existing energy sources. However, many of these low carbon alternatives have been uneconomic or not dispatchable enough to replace the current options.

The term "sulfur equivalents" of "SOX" is used to define dihydrogen sulfide or sulfur dioxide offset equivalence of sulfur emissions. The term "sulfur intensity" is taken to mean the lifecycle SOX generated per unit mass of a product.

Sulfur, in various forms, including but not limited to dihydrogen sulfide, sulfur dioxide, sulfuric acid, and sulfate, is widely recognized as a toxic and harmful atmospheric pollutant and the deposition of sulfur in soil, waterways, and other environments is expected to cause problematic changes to global ecosystems and contribute to myriad of other problems, such as acid rain, soil acidification, deforestation, ocean acidification, and other toxic impacts. The primary causes of dihydrogen sulfide emissions globally are related to petroleum and natural gas extraction and refining, pulp and paper manufacturing, rayon textile production, waste disposal, landfills, water and sewage treatment facilities, and general waste disposal. Additionally, natural factors such as volcanoes, hot springs, thermal vents, geysers, fumaroles, "sour" natural gas fields, biodegraded oil fields, or geothermal power plants also constitute major naturally occurring sources of dihydrogen sulfide.

Given the risks of dihydrogen sulfide and other forms of sulfur emissions, significant work has gone into sulfur removal technologies, the development of low sulfur fuels, or ways to desulfurize existing energy sources and processes. However, many of these low sulfur alternatives themselves create cost prohibitions, are uneconomic, or limit the dispatchability of energy sources.

Based on the risks of sulfur emissions, the U.S. EPA (IRC 45H) has created a cap-and-trade sulfur credit program for offset, sulfur abatement, and sequestration. The U.S. IRS 45Q tax credit program is a similar tax credit program for carbon dioxide sequestration.

In power generation, the alternatives to the highly reliable, low cost, but high emission sources (e.g., gas and coal) are either dispatchable and expensive (e.g., nuclear, hydroelectric, green hydrogen, or blue hydrogen), or inexpensive and intermittent (e.g., solar and wind, green hydrogen in some cases). There is only one existing source that is both lower cost and dispatchable, and that is geothermal. However, geothermal resources are limited, many of the economically productive geothermal resources have already been developed and are nearing end of life, and many geothermal resources are already in decline. As such, the growth outlook for geothermal energy resources is limited without significant technical advances.

Green hydrogen (hydrogen produced from water without the utilization of fossil fuels), which is generated by electrolysis powered from either solar, wind, hydroelectric, renewable natural gas combustion, or geothermal energy can be a reliable source of low carbon energy when coupled with storage, but high capital cost, intermittent production due to intermittent energy sources or high cost of energy when grid connected, and the high cost and low availability of suitable hydrogen storage resources limits applicability. In addition, electrolysis consumes significantly more energy to produce hydrogen than what is stored in the hydrogen, resulting in a low round trip efficiency in the system.

Blue hydrogen faces a similar set of problems to green hydrogen: it takes a low cost, high emission fuel source like coal or natural gas, and by adding expensive and parasitic carbon capture facilities, converts this low-cost-high-emission source of energy into a high-cost-low-emission source. Thus, even though large volumes of hydrogen can be formed in processes that subsequently prevent greenhouse gas emissions from reaching the atmosphere, the newly developed hydrogen resource is not cost competitive with other forms of energy derived from fossil fuels. Additionally, the challenges around finding carbon sequestration resources that can be used to permanently store the captured carbon from these processes result in limited opportunities to deploy these technologies today.

Natural hydrogen (or "gold hydrogen"), produced from the subsurface by drilling and stimulating iron-rich rock, mafic rock, pyrite, iron-rich sandstone, iron-rich sediments, uranium- and thorium-rich rock, uranium- and thorium-rich sediments with or without fracturing or other forms of mechanical stimulation can provide an abundant source of low emission, low cost, fully dispatchable energy.

Each of these energy sources and their inherent advantages and limitations are also relevant to transportation. When considering transportation fuels, by far the major sources of fuel are diesel and gasoline, both derived from crude oil production. Additionally, in recent years, electric vehicles have been gaining market share, but the cost for electric vehicles is still more expensive than fossil fueled equivalents and limitations exist regarding cost, recharge time, and primary resources for battery and energy storage. Given the weight of batteries, electric long-haul trucking is also challenging, and most long-haul truck manufacturers are in search of affordable, low carbon options such as hydrogen-fueled trucking.

Natural hydrogen produced by enhanced hydrogen production reactions would be an answer to the low or negative carbon, low cost, reliable transportation problem for long-haul trucking and potentially other forms of transportation. As for other types of transportation, natural hydrogen as a compressed or liquified product, or as a feedstock for synthetic liquid fuel ("efuels") would be a reliable low cost, low or negative-carbon solution. Additionally, natural hydrogen could be combined with nitrogen to produce a carbon free ammonia product, which is being widely discussed as a potential replacement for bunker fuel for shipping and as a feedstock for synthetic fertilizer manufacturing.

Direct Emissions Reduction: because there are no direct $CO_2$ emissions from the combustion or typical use of hydrogen, the reduction in $CO_2$ emissions is a function of what the hydrogen is replacing. In many cases, low carbon (or negative carbon) hydrogen would be replacing hydrogen from steam methane reforming (SMR) as a chemical feedstock for ammonia production, oil refining, and other chemical manufacturing. In some cases, low carbon (or negative carbon) hydrogen may replace natural gas, diesel fuel, gasoline, or jet fuel as a heat source or transportation fuel.

In the case of ammonia production and refining, natural gas is used to produce hydrogen via steam methane reformation reactions, which is used as a chemical feedstock in both the refining process and the ammonia production process. Today, more than 95% of hydrogen is produced using natural gas in steam methane reformers (SMRs). The carbon intensity of hydrogen production using SMRs without carbon capture is 10.4 tonnes of $CO_2$ emitted for each tonne of hydrogen produced. As such, direct replacement of natural hydrogen for hydrogen manufactured by SMR processes results in a $CO_2$ reduction of 10.4 tonnes $CO_2$/tonne $H_2$.

In power generation with gas turbines, hydrogen must displace the energy (btu) equivalent of natural gas. The energy density of hydrogen is 290 btu/cf or 51,682 btu/lb. By comparison, the energy density of natural gas is 983 btu/cf or 20,267 btu/lb, while the carbon intensity of natural gas is 52.91 kg $CO_2$/mmbtu $CH_4$ or 54.87 kg $CO_2$/mcf $CH_4$, or 3.5 kg $CO_2$/kg $CH_4$.

Because hydrogen is 2.6 times more energy dense per unit mass than natural gas, only 40% of the gross tonnage of fuel is required to achieve the same energy output. As such, burning one tonne of $H_2$ for power generation reduces natural gas consumption by about 2.6 tonnes, and thus $CO_2$ emissions by 9.1 tonnes.

Comparing natural hydrogen produced by enhanced hydrogen production reactions to hydrogen produced by electrolysis, the carbon reduction is a function of the carbon intensity of the power used in the electrolysis process. Although there may be large indirect emissions associated with electrolysis, there are no direct emissions. However, natural hydrogen produced by enhanced hydrogen production may lead to a direct emissions reduction for carbon dioxide, sulfur, or both sulfur and carbon dioxide as part of various EHP processes, including those that directly sequester carbon dioxide emissions, sulfur emissions, and combinations of carbon dioxide emissions and sulfur emissions permanently in mineral forms. With respect to carbon dioxide in instances where $H_2S$ and $CO_2$ are involved in the EHP process, there is a direct emissions reduction of about 10 tonnes of $CO_2$ emitted for each tonne of hydrogen produced, as compared to electrolytically produced hydrogen (or other forms of hydrogen generation). Integration of this process achieves net carbon negative hydrogen production.

Indirect Emissions Reduction: An analysis of the lifecycle carbon intensity of natural hydrogen using the Oil Production Greenhouse Gas Emissions Estimator ("OPGEE") has shown the lifecycle carbon intensity of natural hydrogen to be in the range of 0.1 to 0.4 tonnes $CO_2$/tonne $H_2$ with an additional emissions reduction equivalent to the mass of carbon dioxide mineralized along with sulfur by various sulfur-enhanced hydrogen production methods. Similar studies are not available for other methods of hydrogen production. However, using an average grid intensity of 0.5 tonnes $CO_2$/MWh, and given that electrolysis requires approximately 50 MWh/tonne $H_2$ produced, the indirect emissions associated with electrolysis are about 25 tonnes $CO_2$/tonne $H_2$ produced assuming grid power. Of course, electrolysis unit operators can purchase Renewable Energy Credits to synthetically reduce the carbon footprint of their power usage, but market recognition of this as a method for eliminating real time carbon emissions may not be permanent.

The realization of abundant natural hydrogen can achieve significant reductions in equivalent carbon emissions.

Natural hydrogen reservoirs and targets for the stimulation of subsurface hydrogen production may be found nearby many existing geothermal power plants. Some geothermal plants already have hydrogen making up a portion of their non-condensable gases vented from their systems. However, the methods and system described herein can capture the hydrogen from vent gases and utilize the same to increase output of a geothermal power plant.

The systems and methods described herein utilize the coincidence of subsurface hydrogen resources, the coincidence of subsurface formations from which hydrogen can be produced by enhanced hydrogen production processes, or other forms of synthetic hydrogen formation (e.g., electrolysis, pyrolysis) and geothermal power generation plants. Geothermal power plant performance is enhanced by integrating combustion of hydrogen produced from the above sources into operation of the power plant.

In some embodiments, wind electrolysis, solar electrolysis, hydropower electrolysis, SMR with carbon capture, traditional SMR, and methane pyrolysis may be located in close proximity to geothermal power plants and the hydrogen may be used to enhance the serviceable life and production capacity of existing geothermal plants.

A subset of geothermal plants (e.g., various fields in Iceland, the west coast of the United States, the Pacific Rim, or the East African Rift) are located in regions that tend to be associated with the presence of mafic rock, iron-rich rock, or iron-rich sediments. Geothermal power plants operate by two main methods: (1) Flash steam plants, where hot water and/or steam are extracted from the ground, flashed and run through a turbine, and then condensed and reinjected, or (2) Binary cycle plants, where hot water or brine is brought to the surface, heat exchanged with organic fluids, which are flashed and run through an organic Rankine cycle turbine and then condensed. The cooled water or brine can then be reinjected and moved slowly through the geothermal reservoir to provide pressure support or until it is produced again as hot brine.

It is noted that there is no requirement to provide or address the theory underlying the novel and groundbreaking processes, production rates, performance or other beneficial features and properties that are the subject of, or associated with, embodiments of the present disclosure. Nevertheless, various theories are provided in this specification to further advance the art in this important area, and in particular in the important area of hydrogen, dihydrogen sulfide, carbon dioxide, and helium exploration, production and downstream conversion or utilization. These theories put forth in this specification, and unless expressly stated otherwise, in no way limit, restrict or narrow the scope of protection to be afforded the claimed embodiments. It is further understood that the present disclosure may lead to new, and heretofore unknown theories to explain the conductivities, drainages, resource production, chemistries, and function-features of embodiments of the methods, articles, materials, devices, and system of the present disclosure; and such later developed theories shall not limit the scope of protection afforded the present disclosure.

Other embodiments than those specifically disclosed herein may be included without departing from its spirit or essential characteristics. The described embodiments are to be considered in all respects only as illustrative and not restrictive. The various aspects and embodiments disclosed herein are for purposes of illustration and are not intended to be limiting. The various embodiments of devices, systems, activities, methods, and operations set forth in this specification may be used with, in, or by, various processes, industries, and operations, in addition to those embodiments of the Figures and disclosed in this specification. The various embodiments of devices, systems, methods, activities, and operations set forth in this specification may be used with: other processes, industries, and operations that may be developed in the future: with existing processes, industries, and operations, which may be modified, in-part, based on the teachings of this specification; and with other types of gas recovery and valorization systems and methods. Further, the various embodiments of devices, systems, activities, methods, and operations set forth in this specification may be used with each other in different and various combinations. Thus, for example, the configurations provided in the various embodiments of this specification may be used with each other. For example, the components of an embodiment having A, A', and B and the components of an embodiment having A'', C, and D can be used with each other in various combination, e.g., A, C, D, and A; A'', C, and D, etc., in accordance with the teaching of this specification. Thus, the scope of protection afforded the present inventions should not be limited to a particular embodiment, configuration or arrangement that is set forth in a particular embodiment, example, or in an embodiment in a particular Figure.

Terms of degree (e.g., "about," "substantially," "generally," etc.) indicate structurally or functionally insignificant variations. In an example, when the term of degree is included with a term indicating quantity, the term of degree is interpreted to mean±10%, ±5%, or ±2% of the term indicating quantity. In an example, when the term of degree is used to modify a shape, the term of degree indicates that the shape being modified by the term of degree has the appearance of the disclosed shape. For instance, the term of degree may be used to indicate that the shape may have rounded corners instead of sharp corners, curved edges instead of straight edges, one or more protrusions extending therefrom, is oblong, is the same as the disclosed shape, etc.

What is claimed is:

1. A method of energy production, comprising:

collecting hydrogen from a first hydrogen source;

integrating the hydrogen into at least a portion of a geothermal energy system by combusting the hydrogen to produce energy, wherein the geothermal energy system includes a subsurface rock formation; and collecting additional hydrogen from the subsurface rock formation by injecting one or more of dihydrogen sulfide or carbon dioxide into the subsurface rock formation to react with components in the subsurface formation to form the additional hydrogen; and integrating the additional hydrogen into at least a portion of the geothermal energy system.

2. The method of claim 1, wherein the first hydrogen source comprises at least one of wind electrolysis, solar electrolysis, hydropower electrolysis, nuclear small modular reactor, or collection of natural subsurface hydrogen.

3. The method of claim 1, wherein the hydrogen and the additional hydrogen is integrated into the geothermal energy system by steam methane reformation, steam methane reformation with carbon capture utilization and storage, or electrolyzers.

4. The method of claim 1, further comprising injecting water or brine recovered from the geothermal energy system to stimulate further hydrogen production.

5. The method of claim 1, further comprising capturing and mineralizing $CO_2$ vented from the geothermal energy system.

6. The method of claim 1, wherein the subsurface rock formation comprises at least one of an iron-rich rock; mafic igneous rock; metamorphosed or hydrothermally altered mafic igneous rock; olivine- or pyroxene-bearing igneous or metamorphic sedimentary rock; olivine- or pyroxene-bearing igneous or metamorphic sediment; metamorphosed or hydrothermally altered olivine- or pyroxene-bearing igneous, metamorphic, or sedimentary rock; metamorphosed or hydrothermally altered olivine- or pyroxene-bearing igneous or metamorphic sediment; serpentine mineral-bearing rock; serpentine mineral-bearing rock sediment; partially or completely serpentinized rock; serpentinite; pyrite; iron-rich sandstone; other iron-rich sedimentary rock; or iron-rich sediments.

7. The method of claim 1, wherein the first hydrogen source includes at least one of steam methane reformation, steam methane reformation with carbon capture utilization and storage, pyrolysis, collection of subsurface hydrogen, or electrolysis.

8. The method of claim 7, wherein the electrolysis is performed via at least one of wind electrolysis, solar electrolysis, hydropower electrolysis, nuclear small modular reactor electrolysis.

9. The method of claim 3, wherein the electrolyzers perform at least one of wind electrolysis, solar electrolysis, hydropower electrolysis, and nuclear small modular reactor electrolysis.

10. The method of claim 1, wherein the injecting of one or more of the dihydrogen sulfide or the carbon dioxide into the subsurface rock formation further comprises mineralizing at least one of the dihydrogen sulfide and the carbon dioxide by:

reacting the dihydrogen sulfide and the carbon dioxide with elements of the subsurface rock formation in a reaction comprising one or more of a serpentinization reaction, a pyritization reaction, or a decarbonation reaction.

11. The method of claim 1, further comprising:

heating, with a fluid heat exchange system, one or more of the dihydrogen sulfide or the carbon dioxide injected into the geothermal energy system; and providing heat for steam production in a steam turbine to produce electrical power.

12. The method of claim 1, further comprising augmenting, using an energy source, heat from the geothermal energy system to produce electrical power.

* * * * *